US008971065B2

(12) United States Patent
Juang et al.

(10) Patent No.: US 8,971,065 B2
(45) Date of Patent: Mar. 3, 2015

(54) SYSTEM FOR PROVIDING AN ALTERNATING CURRENT, AND CONTROL APPARATUS AND METHOD THEREOF

(75) Inventors: Kai-Cheung Juang, Hsinchu (TW); Tzu-Yi Yang, Taoyuan (TW); Chung-Lin Tseng, Zhongli (TW); Hsuan-Yu Tsai, Taiping (TW); Yung-Hsi Chang, Yilan (TW)

(73) Assignee: Industrial Technology Research Institute, Hsinchu (TW)

( * ) Notice: Subject to any disclaimer, the term of this patent is extended or adjusted under 35 U.S.C. 154(b) by 631 days.

(21) Appl. No.: 13/198,441

(22) Filed: Aug. 4, 2011

(65) Prior Publication Data

US 2013/0033906 A1 Feb. 7, 2013

(51) Int. Cl.
| H02M 5/458 | (2006.01) |
| H02J 3/36 | (2006.01) |
| H02M 1/12 | (2006.01) |
| H02M 1/14 | (2006.01) |

(Continued)

(52) U.S. Cl.
CPC .............. H02M 7/4807 (2013.01); H02J 3/383 (2013.01); Y02E 10/563 (2013.01)
USPC ..................... 363/37; 363/35; 363/40; 363/41

(58) Field of Classification Search
CPC ........................................... H02M 2007/53876
USPC ........ 323/906; 363/34, 35, 37, 41, 44, 95, 97, 363/98, 40
See application file for complete search history.

(56) References Cited

U.S. PATENT DOCUMENTS

| 4,404,472 A * | 9/1983 | Steigerwald ..................... 307/46 |
| 6,239,997 B1 * | 5/2001 | Deng .............................. 363/95 |

(Continued)

FOREIGN PATENT DOCUMENTS

| CN | 101494385 | 7/2009 |
| CN | 101777776 A | 7/2010 |

(Continued)

OTHER PUBLICATIONS

Hamid et al., "Load Sharing Characteristic of Single Phase PV Inverter Connected to Grid", $2^{nd}$ IEEE International Conference on Power and Energy (PECon 08), Dec. 1-3, Johor Bahru, Malaysia (2008).

(Continued)

Primary Examiner — Emily P Pham
(74) Attorney, Agent, or Firm — Jianq Chyun IP Office

(57) ABSTRACT

A system for providing, from a direct current (DC) voltage source, an alternating current (AC) to an electrical grid outputting a grid voltage, the system including: a transformer for coupling to the DC voltage source through a first switch controlled by a first control signal, and configured to provide a converted voltage based on a DC voltage; a rectifier coupled to the transformer, and configured to generate an envelope voltage of the converted voltage; a plurality of switches coupled to the rectifier to receive the generated envelope voltage of the converted voltage, the plurality of switches being controlled by a plurality of control signals, respectively, and configured to generate the AC from the generated envelope voltage of the converted voltage; and control apparatus coupled to the first switch and the plurality of switches, and configured to provide, based on the grid voltage, the first control signal and the plurality of control signals.

19 Claims, 6 Drawing Sheets

(51) Int. Cl.
*H02M 7/48* (2006.01)
*H02J 3/38* (2006.01)

(56) References Cited

U.S. PATENT DOCUMENTS

| | | | |
|---|---|---|---|
| 6,339,538 B1 | 1/2002 | Handleman | |
| 7,110,752 B2 | 9/2006 | Okajima | |
| 7,280,377 B2 * | 10/2007 | Johnson | 363/97 |
| 7,339,287 B2 | 3/2008 | Jepsen et al. | |
| 7,358,463 B2 * | 4/2008 | Mizuno et al. | 219/497 |
| 7,529,106 B2 * | 5/2009 | Hikosaka | 363/44 |
| 7,719,246 B2 | 5/2010 | Melanson | |
| 7,768,806 B2 * | 8/2010 | Lin et al. | 363/97 |
| 8,304,929 B2 * | 11/2012 | Sweet et al. | 307/9.1 |
| 8,612,058 B2 * | 12/2013 | Khajehoddin et al. | 700/287 |
| 2006/0158136 A1 * | 7/2006 | Chen | 315/308 |
| 2007/0133241 A1 | 6/2007 | Mumtaz et al. | |
| 2008/0123373 A1 | 5/2008 | Roesner et al. | |

FOREIGN PATENT DOCUMENTS

| | | |
|---|---|---|
| CN | 201919211 | 8/2011 |
| DE | 102009055290 A1 | 8/2010 |
| EP | 2061143 A2 | 5/2009 |
| JP | 2003-219688 | 7/2003 |
| JP | 2008-193298 | 8/2008 |

OTHER PUBLICATIONS

Rahim et al, "Multistring Five-Level Inverter With Novel PWM Control Scheme for PV Application", IEEE Transactions On Industrial Electronics, vol. 57, No. 6 (Jun. 2010).

Dasgupta et al., "A New Control Strategy for Single Phase Series Connected PV Module Inverter for Grid Voltage Compensation", National University of Singapore (2009).

Wu et al., "A Single-Phase Inverter System for PV Power Injection and Active Power Filtering With Nonlinear Inductor Consideration", IEEE Transactions on Industry Applications, vol. 41, No. 4 (Jul./Aug. 2005).

Kahrobaeian et al., "Stationary Frame Current Control of Single Phase Grid Connected PV Inverters", $1^{st}$ Power Electronic & Drive Systems & Technologies Conference (2010).

Nge et al., "Power Loss Analysis for Single Phase Grid-Connected PV Inverters", Telecommunications Energy Conference, 2009; INTELEC 2009. $31^{st}$ International (2009).

Patel et al., "MPPT Scheme for a PV-Fed Single-Phase Single-Stage Grid-Connected Inverter Operating in CCM With Only One Current Sensor", IEEE Transactions on Energy Conversion, vol. 24, No. 1 (Mar. 2009).

"Office Action of China Counterpart Application", issued on May 5, 2014, p. 1-p. 6, in which the listed references were cited.

* cited by examiner

SYSTEM FOR PROVIDING AN ALTERNATING CURRENT, AND CONTROL APPARATUS AND METHOD THEREOF

TECHNICAL FIELD

This disclosure relates to apparatus and method for providing an alternating current (AC).

BACKGROUND

A grid-tied electrical system, also known as a tied-to-grid system or a grid-tie system, is a system that generates electricity and provides the electricity to an electrical grid to which the system is tied. Traditionally, the grid-tied electrical system utilizes renewable energy sources such as the sun or wind. For example, the grid-tied electrical system may convert solar energy into electricity via photovoltaic effects.

FIG. 1 illustrates a block diagram of a conventional grid-tied electrical system 100 to provide a single-phase alternating current (AC) to an electrical grid 101 outputting an AC voltage, referred to herein as a grid voltage $V_{grid}$. Referring to FIG. 1, the system 100 is tied to the electrical grid 101, and includes a photovoltaic (PV) array 102, a maximum power point tracking (MPPT) module 104, a first capacitor 106, a first switch 108, and a transformer 110. The system 100 further includes a rectifier 112, a second capacitor 114, and a plurality of switches including, e.g., switches 116-1, 116-2, 116-3, and 116-4.

More particularly, the PV array 102 converts solar energy into direct current (DC) electricity via photovoltaic effects. The MPPT module 104 is coupled to the PV array 102, and is configured to track a maximum power point (MPP) of the PV array 102 and to provide to the transformer 110 an MPP voltage at a relatively low voltage level. A primary side of the transformer 110 is coupled to the MPPT module 104 through the switch 108, and is configured to convert the MPP voltage at the relatively low voltage level to a converted voltage $V_{T0}$ at a relatively high voltage level based on a transformer turns ratio, when the switch 108 opens and closes under control of a predetermined control signal Sa'. When the switch 108 opens, the primary side of the transformer 110 is also open. When the switch 108 closes, the primary side of the transformer 110 is connected to the capacitor 106 though ground. Through this open/close mechanism, the switch 108 performs pulse width modulation (PWM) and transfers energy from the primary side of the transformer 110 to the secondary side of the transformer 110.

The rectifier 112 is coupled to a secondary side of the transformer 110, and is configured to convert the voltage $V_{T0}$, which is generally an AC voltage, to a DC voltage $V_{dc}$. The DC voltage $V_{dc}$ is further smoothed by the capacitor 114. The switches 116-1, 116-2, 116-3, and 116-4 are operable to generate an AC voltage equal to the grid voltage $V_{grid}$, when the switches 116-1 and 116-2 alternately close under control of predetermined control signals S1' and S2', respectively, and the switches 116-3 and 116-4 alternately close under control of predetermined control signals S3' and S4', respectively.

FIG. 2 shows a simulation result including waveforms of the predetermined control signals Sa', S2', S3', and S4' applied to the conventional system 100 (FIG. 1) and the voltages $V_{T0}$, $V_{dc}$, and $V_{grid}$ described above. To show more detail, the voltages $V_{T0}$, $V_{dc}$, and $V_{grid}$ and the control signals Sa', St, S2', S3', and S4' during time periods t1, t2, and t3 have been enlarged. Each of the predetermined control signals Sa', St, S2', S3', and S4' is a periodic pulse signal that has a relatively high frequency. The control signals Sa', St, S2', S3', and S4' switch on/off the switches 108, 116-1, 116-2, 116-3, and 116-4, respectively, with different timings. Further, as shown in FIG. 2, the voltage $V_{T0}$ is an AC voltage having a relatively high frequency and a relatively high voltage level, and the voltage $V_{dc}$ is a DC voltage.

Referring to FIGS. 1 and 2, the switches 116-1, 116-2, 116-3, and 116-4 operate at the relatively high frequency under the control of the predetermined control signals St, S2', S3', and S4', respectively. In addition, the capacitor 114 operates at the relatively high voltage level. As a result, a life time of the system 100 may be reduced due to high system wear.

SUMMARY

According to a first aspect of the present disclosure, there is provided a system for providing, from a direct current (DC) voltage source, an alternating current (AC) to an electrical grid outputting a grid voltage, the system comprising: a transformer for coupling to the DC voltage source through a first switch controlled by a first control signal, and configured to provide a converted voltage based on a DC voltage; a rectifier coupled to the transformer, and configured to generate an envelope voltage of the converted voltage; a plurality of switches coupled to the rectifier to receive the generated envelope voltage of the converted voltage, the plurality of switches being controlled by a plurality of control signals, respectively, and configured to generate the AC from the generated envelope voltage of the converted voltage; and control apparatus coupled to the first switch and the plurality of switches, and configured to provide, based on the grid voltage, the first control signal and the plurality of control signals.

According to a second aspect of the present disclosure, there is provided control apparatus to provide a first control signal and a plurality of control signals for a system for providing an alternating current (AC) to an electrical grid outputting a grid voltage, wherein the system includes at least a transformer for coupling to a direct current (DC) voltage source through a first switch controlled by the first control signal and configured to generate a converted voltage based on the DC voltage, and a plurality of switches controlled by the plurality of control signals, respectively, the plurality of switches configured to generate the AC from an envelope voltage of the converted voltage, the control apparatus comprising: an envelope extractor configured to extract a feedback envelope voltage of the grid voltage; a variable-gain amplifier coupled to the envelope extractor, and configured to amplify the feedback envelope voltage of the grid voltage; a first pulse modulator coupled to the variable-gain amplifier, and configured to generate a first pulse modulation signal as the first control signal, based on the amplified feedback envelope voltage of the grid voltage; a second pulse modulator configured to generate a second pulse modulation signal based on the grid voltage; a comparator configured to compare the grid voltage with the envelope voltage of the converted voltage, and to generate a mode control signal based on the comparison; and a mode controller coupled to the second pulse modulator and the comparator, and configured to generate the plurality of control signals based on at least the mode control signal.

According to a third aspect of the present disclosure, there is provided a method to provide a first control signal and a plurality of control signals for a system for providing an alternating current (AC) to an electrical grid outputting a grid voltage, wherein the system includes at least a transformer for coupling to a direct current (DC) voltage source through a first switch controlled by the first control signal and configured to generate a converted voltage based on the DC voltage, and a plurality of switches controlled by the plurality of control signals, respectively, the plurality of switches configured to generate the AC from an envelope voltage of the converted voltage, the method comprising: extracting a feedback envelope voltage of the grid voltage; amplifying the extracted feedback envelope voltage of the grid voltage; generating a first pulse modulation signal as the first control signal, based on the amplified feedback envelope voltage of the grid voltage; generating a second pulse modulation signal based on the grid voltage; comparing the grid voltage with the envelope voltage of the converted voltage, to generate a mode control signal based on the comparison; and generating the plurality of control signals based on at least the mode control signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of systems and methods consistent with aspects related to the invention as recited in the appended claims.

Figure 3:
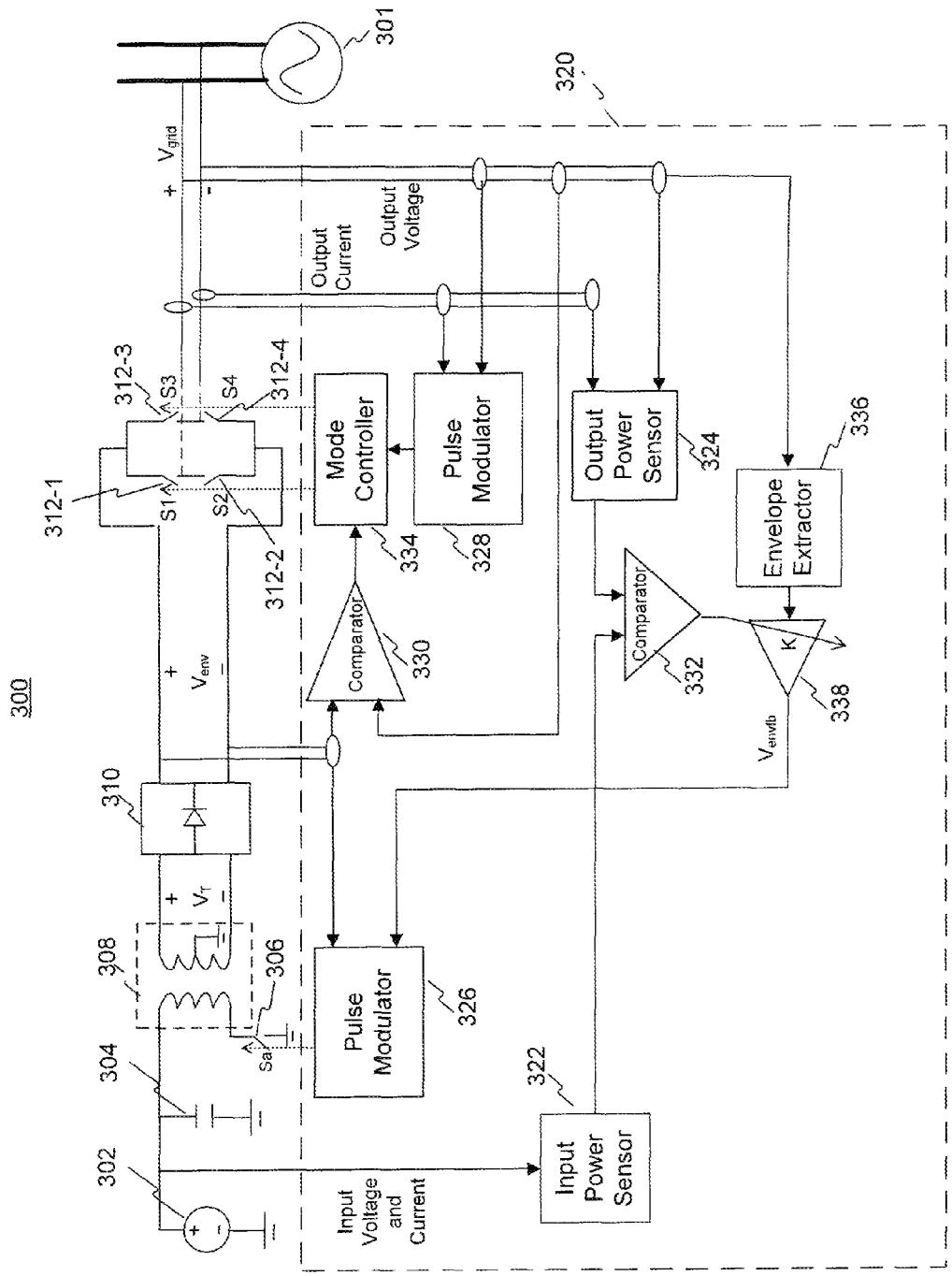
FIG. 3 illustrates a block diagram of a grid-tied electrical system to provide single-phase AC to an electrical grid, according to an exemplary embodiment.

FIG. 3 illustrates a block diagram of a grid-tied electrical system 300 to provide a single-phase alternating current (AC) to an electrical grid 301 outputting a single-phase AC voltage, referred to herein as a grid voltage $V_{grid}$, according to an exemplary embodiment. Referring to FIG. 3, the system 300 is tied to the electrical grid 301, and includes a direct current (DC) voltage source 302, a capacitor 304, a first switch 306, a transformer 308, a rectifier 310, and a plurality of switches including, e.g., switches 312-1, 312-2, 312-3, and 312-4. The system 300 further includes a control apparatus 320 to provide control signals Sa, S1, S2, S3, and S4 to control the switch 306 and the switches 312-1, 312-2, 312-3, and 312-4, respectively, to control operation of the system 300.

In exemplary embodiments, the DC voltage source 302 is configured to provide a DC voltage at a relatively low voltage level from which the system 300 generates the AC voltage $V_{grid}$. For example, the DC voltage source 302 may be a photovoltaic (PV) array that converts solar energy into DC electricity via photovoltaic effects, or a wind power system. The DC voltage source 302 may also include a maximum power point tracking (MPPT) module, not shown, configured to track a maximum power point (MPP) of the DC voltage source 302 and to provide an MPP voltage as the DC voltage to the transformer 308.

In exemplary embodiments, the capacitor 304 is coupled in parallel with the DC voltage source 302. A primary side of the transformer 308 is coupled to the DC voltage source 302 and to ground via the switch 306. The transformer 308 so coupled is configured to output on a secondary side a converted voltage $V_T$ at a relatively high voltage level based on a transformer turns ratio, when the switch 306 opens and closes under control of the control signal Sa provided by the control apparatus 320. When the switch 306 opens, the primary side of the transformer 308 is also open. When the switch 306 closes, the primary side of the transformer 308 is connected to the DC voltage source 302 and the capacitor 304 though ground. Through this open/close mechanism, the switch 306 performs pulse width modulation (PWM) and transfers energy from the primary side of the transformer 308 to the second side of the transformer 308. The switch 306 may have a switching frequency ranging from several KHz to hundreds of KHz.

In exemplary embodiments, the rectifier 310 is coupled to the secondary side of the transformer 308, and is configured to generate an envelope voltage $V_{env}$ from the converted voltage $V_T$. The system 300 may then generate the single-phase AC, when the switches 312-1 and 312-2 alternately close under control of the control signals S1 and S2, respectively, and the switches 312-3 and 312-4 alternately close under control of the control signals S3 and S4, respectively.

In exemplary embodiments, the control apparatus 320 may include an input power sensor 322, an output power sensor 324, a first pulse modulator 326, a second pulse modulator 328, a first comparator 330, a second comparator 332, a mode controller 334, an envelope extractor 336, and a variable-gain amplifier 338.

In exemplary embodiments, the input power sensor 322 is configured to sense an input power of the system 300 from the DC voltage source 302, and the output power sensor 324 is configured to sense an output power of the system 300 to the electrical grid 301. For example, the input power sensor 322 may sense the input power of the system 300 by sensing a voltage outputted from the DC voltage source 302 and a current flowing from the DC voltage source 302. Also for example, the output power sensor 324 may sense the output power of the system 300 by sensing the grid voltage $V_{grid}$ and a corresponding output current.

In exemplary embodiments, the comparator 332 is coupled to the input power sensor 322 and the output power sensor 324. The comparator 332 is configured to compare the sensed output power of the system 300 with the sensed input power of the system 300, to output a gain adjusting signal to adjust a gain of the variable-gain amplifier 338 based on the comparison. For example, the sensed output power is typically close to the sensed input power. If the comparator 332 determines that the sensed output power is larger than the sensed input power, the comparator 332 outputs the gain adjusting signal to decrease the gain of the variable-gain amplifier 338. Also for example, if the comparator 332 determines that the sensed output power is smaller than the sensed input power, the comparator 332 outputs the gain adjusting signal to increase the gain of the variable-gain amplifier 338.

In exemplary embodiments, the envelope extractor 336 is configured to extract a feedback envelope voltage from the grid voltage $V_{grid}$. The variable-gain amplifier 338 is coupled to the envelope extractor 336 and the comparator 332, and is configured to amplify the extracted feedback envelope voltage. As described above, the gain of variable-gain amplifier 338 is adjustable by the gain adjusting signal outputted from the comparator 332. The variable-gain amplifier 338 further outputs the amplified feedback envelope voltage $V_{envfb}$ to the pulse modulator 326.

In exemplary embodiments, the pulse modulator 326 is configured to generate the control signal Sa based on a pulse modulation technique such as a pulse-width modulation (PWM) technique. For example, the pulse modulator 326 uses the amplified feedback envelope voltage $V_{envfb}$ from the variable-gain amplifier 338 as an input reference, and generates a first pulse modulation signal as the control signal Sa to control the corresponding envelope voltage $V_{env}$ outputted from the rectifier 310, which is fed back to the pulse modulator 326. Also for example, based on the PWM technique, the pulse modulator 326 may output a pulse sequence. When an amplitude of the amplified feedback envelope voltage $V_{envfb}$ from the variable-gain amplifier 338 becomes larger, the pulse modulator 326 may generate a sequence of wide pulses to correspondingly make larger an amplitude of the envelope voltage $V_{env}$ outputted from the rectifier 310.

In exemplary embodiments, the pulse modulator 328 is configured to generate a second pulse modulation signal based on a pulse modulation technique such as a pulse-width modulation (PWM) technique. For example, the pulse modulator 328 uses the grid voltage $V_{grid}$ as an input reference, and generates the second pulse modulation signal to control the corresponding output current, which is fed back to the pulse modulator 328.

In exemplary embodiments, the comparator 330 is configured to compare the grid voltage $V_{grid}$ with the envelope voltage $V_{env}$ outputted from the rectifier 310, and to generate a mode control signal indicating whether or not a difference between the grid voltage $V_{grid}$ and the envelope voltage $V_{env}$ is larger than a second predetermined threshold value. The mode controller 334 is coupled to the comparator 330 and the pulse modulator 328, and is configured to generate the control signals S1, S2, S3, and S4 to control the switches 312-1, 312-2, 312-3, and 312-4, respectively, based on at least the mode control signal.

In one exemplary embodiment, the comparator 330 determines that the difference between the grid voltage $V_{grid}$ and the envelope voltage $V_{env}$ outputted from the rectifier 310 is larger than the second predetermined threshold value, and outputs the mode control signal indicating the determination to the mode controller 334. Accordingly, the mode controller 334 controls the switches 312-1, 312-2, 312-3, and 312-4 to operate in a normal mode. In the normal mode, the mode controller 334 generates the control signals S1, S2, S3, and S4 based on the second pulse modulation signal from the pulse modulator 328. By controlling the switches 312-1, 312-2, 312-3, and 312-4 to operate in the normal mode, the switches 312-1, 312-2, 312-3, and 312-4 generate the AC, and an AC voltage equal to the grid voltage $V_{grid}$ by adjusting, e.g., compensating, the envelope voltage $V_{env}$ outputted from the rectifier 310.

In one exemplary embodiment, the comparator 332 determines that the difference between the grid voltage $V_{grid}$ and the envelope voltage $V_{env}$ outputted from the rectifier 310 is not larger than the second predetermined threshold value, and outputs the mode control signal indicating the determination to the mode controller 334. Accordingly, the mode controller 334 controls the switches 312-1, 312-2, 312-3, and 312-4 to operate in a bypass mode. In the bypass mode, the mode controller 334 generates the control signals S1, S2, S3, and S4 to control the switches 312-1, 312-2, 312-3, and 312-4, respectively, to conduct and switch a polarity of the envelope voltage $V_{env}$ outputted from the rectifier 310, without adjusting the envelope voltage $V_{env}$, for generating the AC and the AC voltage equal to the grid voltage $V_{grid}$. Because in the bypass mode the switches 312-1, 312-2, 312-3, and 312-4 operate at a relatively low frequency compared to that of the second pulse modulation signal from the pulse modulator 328, system wear may be reduced and system efficiency may be improved.

Figure 1:
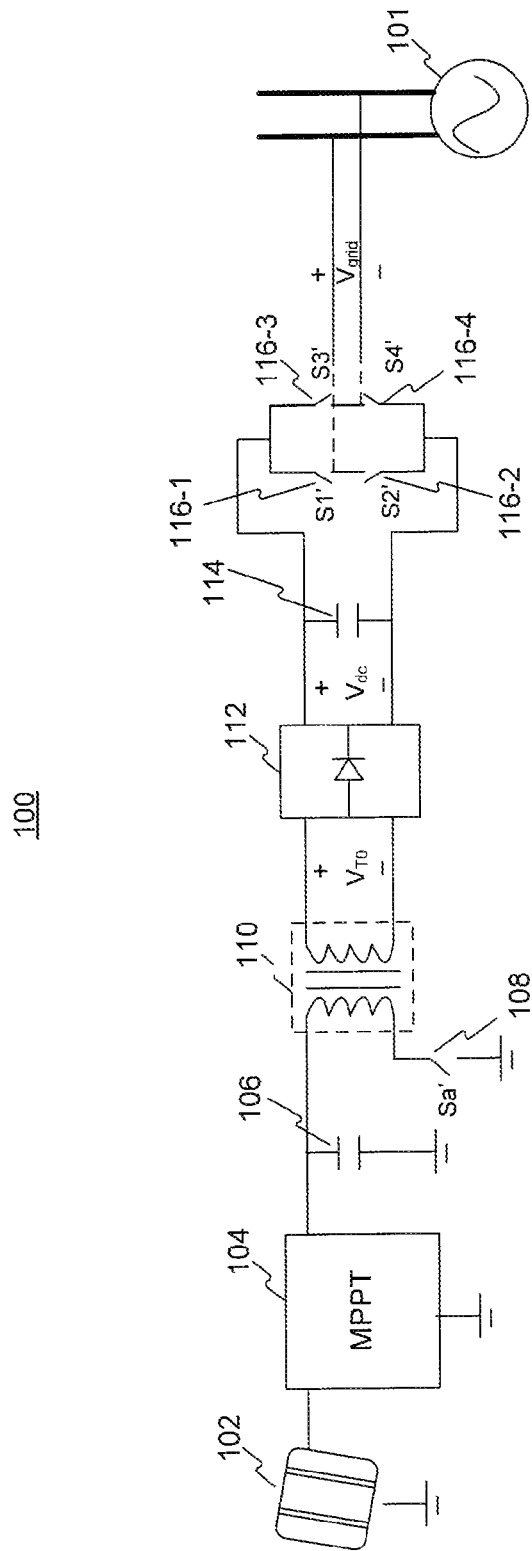
FIG. 1 illustrates a block diagram of a conventional grid-tied electrical system to provide a single-phase alternating current (AC) to an electrical grid.
Figure 2:
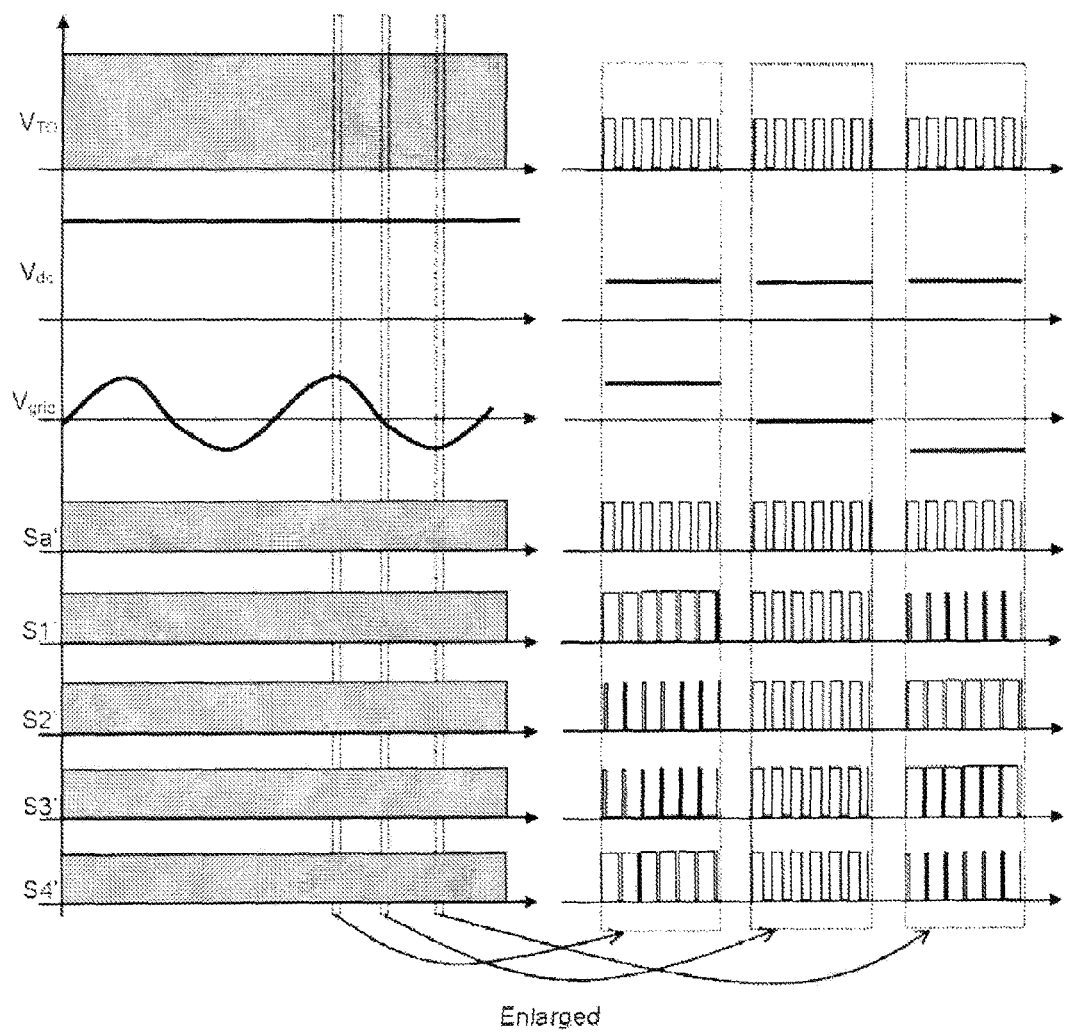
FIG. 2 shows a simulation result including waveforms of predetermined control signals applied to the conventional grid-tied electrical system illustrated in FIG. 1 and waveforms of voltages.
Figure 4:
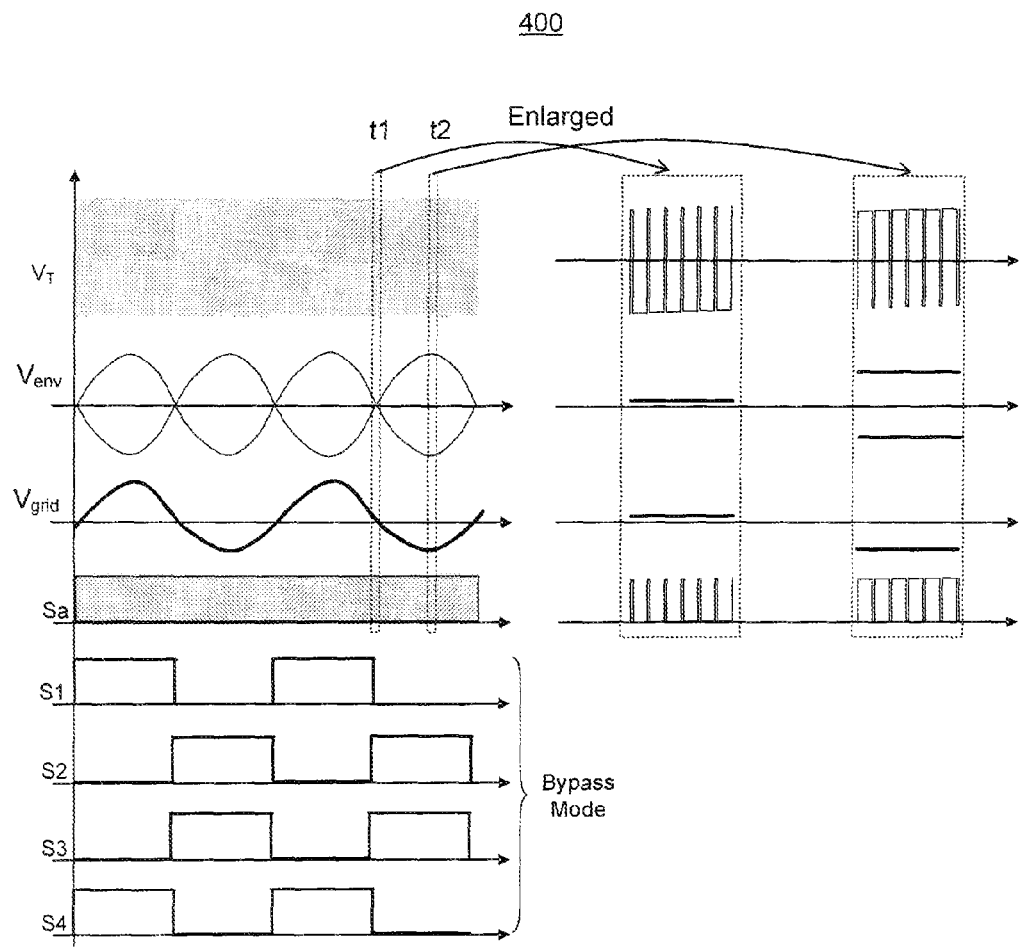
FIG. 4 shows a simulation result including waveforms of control signals provided by a control apparatus and waveforms of voltages, according to an exemplary embodiment.

FIG. 4 shows a simulation result 400 including waveforms of the control signals Sa, S1, S2, S3, and S4 provided by the control apparatus 320 (FIG. 3) and waveforms of the voltages $V_T$, $V_{env}$, and $V_{grid}$ described above, according to an exemplary embodiment. To show more detail, the voltages $V_T$, $V_{env}$, and $V_{grid}$ and the control signal Sa during a first time period t1 and a second time period t2 have been enlarged. As shown in FIG. 4, the voltage $V_T$ and the control signal Sa are each a pulse signal with a varying pulse width and having a relatively high frequency, while the control signals Sa, S1, S2, S3, and S4 each have a relatively low frequency. In addition, the voltage $V_{env}$ is a non-DC voltage and is different from the voltage $V_{dc}$ shown in FIG. 2.

Referring to FIGS. 3 and 4, in the exemplary embodiment, the mode controller 334 controls the switches 312-1, 312-2, 312-3, and 312-4 to operate in the bypass mode. The mode controller 334 generates the control signals S1, S2, S3, and S4 to control the switches 312-1, 312-2, 312-3, and 312-4, respectively, to conduct and switch a polarity of the envelope voltage $V_{env}$ as the generated AC voltage. Because the switches 312-1, 312-2, 312-3, and 312-4 operate at the relatively low frequency in the bypass mode, system wear may be reduced and system efficiency may be improved.

Figure 5:
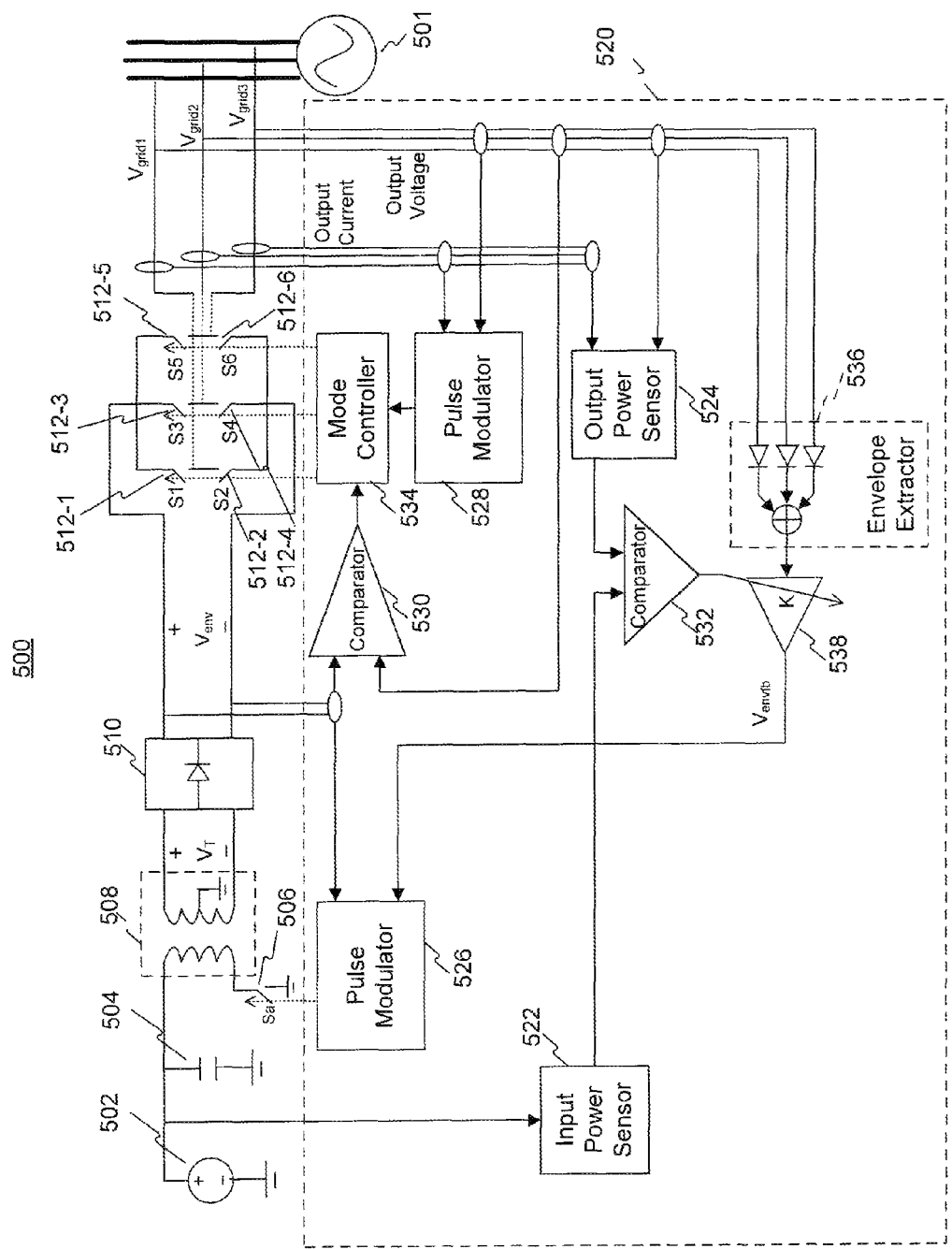
FIG. 5 illustrates a block diagram of a grid-tied electrical system to provide three-phase AC to an electrical grid, according to an exemplary embodiment.

FIG. 5 illustrates a block diagram of a grid-tied electrical system 500 to provide three-phase AC to an electrical grid 501 outputting a three-phase AC voltage, referred to herein as a grid voltage, including three voltage components $V_{grid1}$, $V_{grid2}$, and $V_{grid3}$, according to an exemplary embodiment. Referring to FIG. 5, the system 500 is tied to the electrical grid 501, and includes a DC voltage source 502, a capacitor 504, a first switch 506, a transformer 508, a rectifier 510, and a plurality of switches including, e.g., switches 512-1, 512-2, 512-3, 512-4, 512-5, and 512-6. The system 500 further includes a control apparatus 520 to provide control signals Sa, S1, S2, S3, S4, S5, and S6 to control the switch 506 and the switches 512-1, 512-2, 512-3, 512-4, 512-5, and 512-6, respectively, to control operation of the system 500.

In exemplary embodiments, the DC voltage source 502, the capacitor 504, the switch 506, the transformer 508, and the rectifier 510 operate in a manner similar to the DC voltage source 302, the capacitor 304, the switch 306, the transformer 308, and the rectifier 310 (FIG. 3), respectively. For example, the rectifier 510 is configured to generate an envelope voltage $V_{env}$ of a converted voltage $V_T$ outputted on a secondary side of the transformer 508 and to output the envelope voltage $V_{env}$. The system 500 may then generate the three-phase AC as an output based on the grid voltage including the three voltage components $V_{grid1}$, $V_{grid2}$, and $V_{grid3}$, when the switches 512-1 and 512-2 alternately close under control of the control signals S1 and S2, respectively, the switches 512-3 and 512-4 alternately close under control of the control signals S3 and S4, respectively, and the switches 512-5 and 512-6 alternately close under control of the control signals S5 and S6, respectively.

In exemplary embodiments, the control apparatus 520 may include an input power sensor 522, an output power sensor 524, a first pulse modulator 526, a second pulse modulator 528, a first comparator 530, a second comparator 532, a mode controller 534, an envelope extractor 536, and a variable-gain amplifier 538. The control apparatus 520 operates in a manner similar to the control apparatus 320 (FIG. 3).

Different from the control apparatus 320 (FIG. 3), because the output voltage of the system 500 is three-phase AC, the envelope extractor 536 extracts three feedback envelope voltages for the three voltage components $V_{grid1}$, $V_{grid2}$, and $V_{grid3}$, respectively, and then summates the three feedback envelope voltages for the three voltage components to obtain a feedback envelope voltage of the grid voltage. The output power sensor 524 also senses three component powers for the three voltage components $V_{grid1}$, $V_{grid2}$, and $V_{grid3}$, respectively, and then summates the three component powers to obtain an output power of the system 500.

In addition, the pulse modulator 528 generates a pulse modulation signal including three signal components based on the three voltage components $V_{grid1}$, $V_{grid2}$, and $V_{grid3}$, respectively, each of the three signal components itself being a pulse modulation signal. For example, the pulse modulator 528 uses the voltage component $V_{grid1}$ as an input reference, and generates the first signal component. Similarly, the pulse modulator 528 generates the second and third signal components of the pulse modulation signal. The mode controller 534 then uses the first, second, and third signal components of the pulse modulation signal to generate the control signals for the switches 512-1 and 512-2, the switches 512-3 and 512-4, and the switches 512-5 and 512-6, respectively.

In exemplary embodiments, the comparator 530 is configured to compare the grid voltage with the envelope voltage $V_{env}$ outputted from the rectifier 510, and to generate a mode control signal indicating whether or not a difference between the grid voltage and the envelope voltage $V_{env}$ is larger than a predetermined threshold value. For example, the comparator 530 may separately compare the three voltage components $V_{grid1}$, $V_{grid2}$, and $V_{grid3}$ of the grid voltage with the envelope voltage $V_{env}$, and output the mode control signal including first, second, and third signal components respectively indicating whether or not a difference between the envelope voltage $V_{env}$ and one of the three voltage components $V_{grid1}$, $V_{grid2}$, and $V_{grid3}$ is larger than the predetermined threshold value. The mode controller 534 then generates the control signals S1 and S2 based on at least the first signal component of the mode control signal, generates the control signals S3 and S4 based on at least the second signal component of the mode control signal, and generates the control signals S5 and S6 based on at least the third signal component of the mode control signal.

In one exemplary embodiment, the comparator 530 determines that a difference between a voltage component, e.g., $V_{grid1}$, of the grid voltage and the envelope voltage $V_{env}$ outputted from the rectifier 510 is larger than the predetermined threshold, and outputs the mode control signal including the first signal component to indicate the determination to the mode controller 534. Accordingly, the mode controller 534 controls the switches 512-1 and 512-2 to operate in a normal mode. In the normal mode, the mode controller 534 uses the first signal component of the pulse modulation signal received from the pulse modulator 528 to generate the control signals S1 and S2 to control the switches 512-1 and 512-2, respectively. By controlling the switches 512-1 and 512-2 to operate in the normal mode, the switches 512-1 and 512-2 generate a component of the three-phase AC, and the voltage component $V_{grid1}$ by adjusting, e.g., compensating, the envelope voltage $V_{env}$ outputted from the rectifier 510. Similarly, the mode controller 534 may control the switches 512-3 and 512-4 and the switches 512-5 and 512-6 to operate in the normal mode.

In one exemplary embodiment, the comparator 530 determines that a difference between a voltage component, e.g., $V_{grid1}$, of the grid voltage and the envelope voltage $V_{env}$ outputted from the rectifier 510 is not larger than the predetermined threshold, and outputs the mode control signal including the first signal component to indicate the determination to the mode controller 534. Accordingly, the mode controller 534 controls the switches 512-1 and 512-2 to operate in a bypass mode. In the bypass mode, the mode controller 534 generates the control signals S1 and S2 to control the switches 512-1 and 512-2, respectively, to conduct and switch a polarity of the envelope voltage $V_{env}$ outputted from the rectifier 510, without adjusting the envelope $V_{env}$, for generating a component of the three-phase AC, and the voltage component $V_{grid1}$. Because in the bypass mode the switches 512-1 and 512-2 operate at a relatively low frequency compared to that of the first signal component of the pulse modulation signal from the pulse modulator 528, system wear may be reduced and system efficiency may be improved. Similarly, the mode controller 534 may control the switches 512-3 and 512-4 and the switches 512-5 and 512-6 to operate in the bypass mode.

Figure 6:
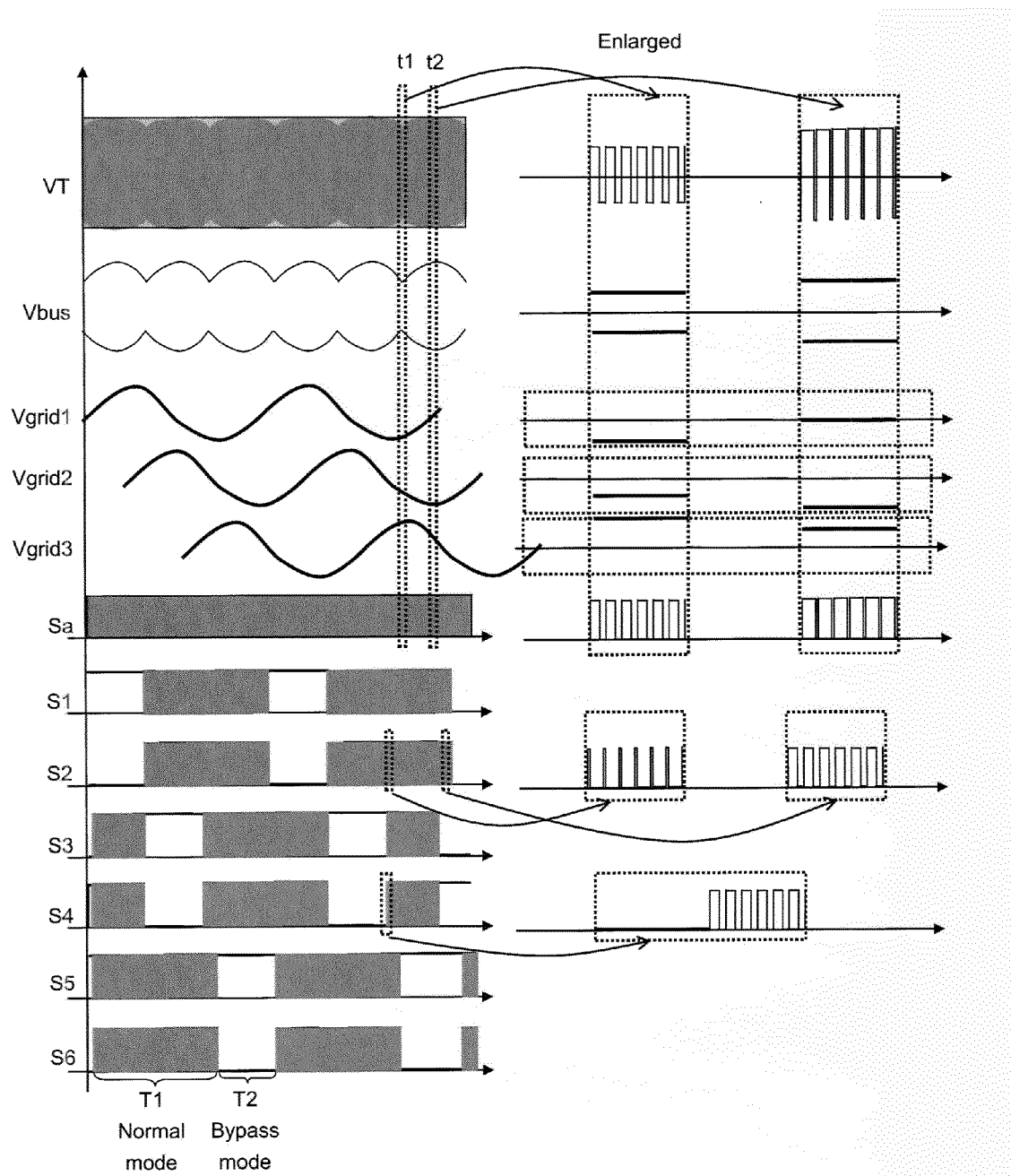
FIG. 6 shows a simulation result including waveforms of control signals provided by a control apparatus and waveforms of voltages, according to an exemplary embodiment.

FIG. 6 shows a simulation result 600 including waveforms of the control signals Sa, S1, S2, S3, S4, S5, and S6 provided by the control apparatus 520 (FIG. 5) and waveforms of the voltages $V_T$, $V_{env}$, $V_{grid1}$, $V_{grid2}$, and $V_{grid3}$ described above, according to an exemplary embodiment. To show more detail, the voltages $V_T$, $V_{env}$, $V_{grid1}$, $V_{grid2}$, and $V_{grid3}$, and the control signal Sa, S2, and S4 during a first time period t1 and a second time period t2 have been enlarged. As shown in FIG. 6, the voltage $V_T$ and the control signal Sa are each a pulse signal with a varying pulse width and having a relatively high frequency. In addition, the voltage $V_{env}$ is a non-DC voltage and is different from the voltage $V_{dc}$ shown in FIG. 2.

Referring to FIGS. 5 and 6, in the exemplary embodiment, the mode controller 534 controls the switches 512-1, 512-2, 512-3, 512-4, 512-5, and 512-6 to operate in the normal mode or the bypass mode. For example, the mode controller 534 generates the control signals S5 and S6 to control the switches 512-5 and 512-6, respectively, to operate in the normal mode during a first time period T1. Also for example, the mode controller 534 generates the control signals S5 and S6 to control the switches 512-5 and 512-6, respectively, to operate in the bypass mode during a second time period T2. Because the switches 512-5 and 512-6 operate at the relatively low frequency in the bypass mode, system wear may be reduced and system efficiency may be improved.

Other embodiments of the invention will be apparent to those skilled in the art from consideration of the specification and practice of the invention disclosed herein. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A system for providing, from a direct current (DC) voltage source, an alternating current (AC) to an electrical grid outputting a grid voltage, the system comprising:
   a transformer for coupling to the DC voltage source through a first switch controlled by a first control signal, and configured to provide a converted voltage based on a DC voltage;
   a rectifier coupled to the transformer, and configured to generate an envelope voltage of the converted voltage;
   a plurality of switches coupled to the rectifier to receive the envelope voltage of the converted voltage, the plurality of switches being controlled by a plurality of control signals, respectively, and configured to generate the AC from the envelope voltage of the converted voltage; and
   control apparatus coupled to the first switch and the plurality of switches, and configured to provide, based on the grid voltage, the first control signal and the plurality of control signals, wherein the control apparatus comprises:
      an envelope extractor configured to extract a feedback envelope voltage of the grid voltage;
      a variable-gain amplifier coupled to the envelope extractor, and configured to amplify the feedback envelope voltage of the grid voltage to generate an amplified feedback envelope voltage of the grid voltage; and
      a first pulse modulator, coupled to the variable-gain amplifier and the rectifier, configured to generate a first pulse modulation signal as the first control signal, based on the amplified feedback envelope voltage of the grid voltage.

2. The system of claim 1, wherein the DC voltage source includes a photovoltaic (PV) array configured to provide the DC voltage based on solar energy, the system further comprising:
   a maximum power point tracking (MPPT) module coupled to the PV array, and configured to track a maximum power point (MPP) of the PV array.

3. The system of claim 1, further comprising:
   a capacitor coupled in parallel to the DC voltage source.

4. The system of claim 1, wherein the control apparatus further comprises:
   an input power sensor configured to sense an input power of the system;
   an output power sensor configured to sense an output power of the system; and
   a comparator, coupled to the input power sensor and the output power sensor, configured to perform a comparison between the input power and the output power, and to output, based on the comparison, a gain adjusting signal to adjust a gain of the variable-gain amplifier.

5. The system of claim 1, wherein the control apparatus comprises:
   a second pulse modulator configured to generate a second pulse modulation signal based on the grid voltage;
   a comparator configured to perform a comparison between the grid voltage and the envelope voltage of the converted voltage, and to generate a mode control signal based on the comparison; and
   a mode controller coupled to the second pulse modulator and the comparator, and configured to generate the plurality of control signals based on at least the mode control signal.

6. The system of claim 5, wherein when the mode control signal indicates that a difference between the grid voltage and the envelope voltage of the converted voltage is larger than a predetermined threshold value, the mode controller is configured to:
   generate, based on the second pulse modulation signal, a first one of the plurality of control signals to control a first one of the plurality of switches to operate in a normal mode in which the first one of the plurality of switches adjusts the envelope voltage of the converted voltage.

7. The system of claim 5, wherein when the mode control signal indicates that a difference between the grid voltage and the envelope voltage of the converted voltage is not larger than a predetermined threshold value, the mode controller is configured to:
   generate a first one of the plurality of control signals to control a first one of the plurality of switches to operate in a bypass mode in which the first one of the plurality of switches conducts and switches a polarity of the envelope voltage of the converted voltage.

8. The system of claim 1, being configured to provide a single-phase AC.

9. The system of claim 1, being configured to provide a three-phase AC.

10. Control apparatus to provide a first control signal and a plurality of control signals for a system for providing an alternating current (AC) to an electrical grid outputting a grid voltage, wherein the system includes at least a transformer for coupling to a direct current (DC) voltage source through a first switch controlled by the first control signal and configured to generate a converted voltage based on the DC voltage, and a plurality of switches controlled by the plurality of control signals, respectively, the plurality of switches configured to generate the AC from an envelope voltage of the converted voltage, the control apparatus comprising:
   an envelope extractor configured to extract a feedback envelope voltage of the grid voltage;
   a variable-gain amplifier coupled to the envelope extractor, and configured to amplify the feedback envelope voltage of the grid voltage to generate an amplified feedback envelope voltage of the grid voltage;
   a first pulse modulator coupled to the variable-gain amplifier, and configured to generate a first pulse modulation signal as the first control signal, based on the amplified feedback envelope voltage of the grid voltage;
   a second pulse modulator configured to generate a second pulse modulation signal based on the grid voltage;
   a comparator configured to perform a first comparison between the grid voltage and the envelope voltage of the converted voltage, and to generate a mode control signal based on the first comparison; and
   a mode controller coupled to the second pulse modulator and the comparator, and configured to generate the plurality of control signals based on at least the mode control signal.

11. The control apparatus of claim 10, wherein the comparator is a first comparator, the control apparatus further comprising:
   an input power sensor configured to sense an input power of the system;

an output power sensor configured to sense an output power of the system; and a second comparator coupled to the input power sensor and the output power sensor, and configured to perform a second comparison between the input power and the output power, and to output, based on the second comparison, a gain adjusting signal to adjust a gain of the variable-gain amplifier.

12. The control apparatus of claim 10, wherein the grid voltage is a three-phase AC voltage including three voltage components, the envelope extractor being configured to:

extract three feedback envelope voltages for the three voltage components, respectively; and summate the three feedback envelope voltages for the three voltage components to obtain the feedback envelope voltage of the grid voltage.

13. The control apparatus of claim 10, wherein when the mode control signal indicates that a difference between the grid voltage and the envelope voltage of the converted voltage is larger than a predetermined threshold value, the mode controller is configured to:

generate, based on the second pulse modulation signal, a first one of the plurality of control signals to control a first one of the plurality of switches to operate in a normal mode in which the first one of the plurality of switches adjusts the envelope voltage of the converted voltage.

14. The control apparatus of claim 10, wherein when the mode control signal indicates that a difference between the grid voltage and the envelope voltage of the converted voltage is not larger than a predetermined threshold value, the mode controller is configured to:

generate a first one of the plurality of control signals to control a first one of the plurality of switches to operate in a bypass mode in which the first one of the plurality of switches conducts and switches a polarity of the envelope voltage of the converted voltage.

15. A method to provide a first control signal and a plurality of control signals for a system for providing an alternating current (AC) to an electrical grid outputting a grid voltage, wherein the system includes at least a transformer for coupling to a direct current (DC) voltage source through a first switch controlled by the first control signal and configured to generate a converted voltage based on the DC voltage, and a plurality of switches controlled by the plurality of control signals, respectively, the plurality of switches configured to generate the AC from an envelope voltage of the converted voltage, the method comprising:

extracting a feedback envelope voltage of the grid voltage;

amplifying the extracted feedback envelope voltage of the grid voltage to generate an amplified feedback envelope voltage of the grid voltage;

generating a first pulse modulation signal as the first control signal, based on the amplified feedback envelope voltage of the grid voltage;

generating a second pulse modulation signal based on the grid voltage;

performing a first comparison between the grid voltage with and the envelope voltage of the converted voltage, to generate a mode control signal based on the first comparison; and generating the plurality of control signals based on at least the mode control signal.

16. The method of claim 15, further comprising:

sensing an input power of the system;

sensing an output power of the system; and performing a second comparison between the input power and the output power and, based on the second comparison, outputting a gain adjusting signal to adjust a gain of the variable-gain amplifier.

17. The method of claim 15, wherein the grid voltage is a three-phase AC voltage including three voltage components, the extracting comprising:

extracting three feedback envelope voltages for the three voltage components, respectively; and summating the three feedback envelope voltages for the three voltage components to obtain the feedback envelope voltage of the grid voltage.

18. The method of claim 15, wherein when the mode control signal indicates that a difference between the grid voltage and the envelope voltage of the converted voltage is larger than a predetermined threshold value, the generating of the plurality of control signals comprises:

generating, based on the second pulse modulation signal, a first one of the plurality of control signals to control a first one of the plurality of switches to operate in a normal mode in which the first one of the plurality of switches adjusts the envelope voltage of the converted voltage.

19. The method of claim 15, wherein when the mode control signal indicates that a difference between the grid voltage and the envelope voltage of the converted voltage is not larger than a predetermined threshold value, the generating of the plurality of control signals comprises:

generating a first one of the plurality of control signals to control a first one of the plurality of switches to operate in a bypass mode in which the first one of the plurality of switches conducts and switches a polarity of the envelope voltage of the converted voltage without adjustment.

* * * * *